United States Patent
Chaturvedi

(10) Patent No.: US 9,141,688 B2
(45) Date of Patent: Sep. 22, 2015

(54) SEARCH IN NETWORK MANAGEMENT UI CONTROLS

(75) Inventor: Animesh Chaturvedi, Fremont, CA (US)

(73) Assignee: Foundry Networks LLC, San Jose, CA (US)

( * ) Notice: Subject to any disclaimer, the term of this patent is extended or adjusted under 35 U.S.C. 154(b) by 454 days.

(21) Appl. No.: 11/899,843

(22) Filed: Sep. 7, 2007

(65) Prior Publication Data

US 2010/0153385 A1   Jun. 17, 2010

(51) Int. Cl.
*G06F 17/30* (2006.01)
*H04L 12/24* (2006.01)

(52) U.S. Cl.
CPC .......... *G06F 17/30643* (2013.01); *H04L 41/22* (2013.01)

(58) Field of Classification Search
CPC ..................... H04L 41/22; G06F 17/30643
USPC .................................................. 709/223, 224
See application file for complete search history.

(56) References Cited

U.S. PATENT DOCUMENTS

| | | | |
|---|---|---|---|
| 6,041,347 A * | 3/2000 | Harsham et al. | 709/220 |
| 6,636,239 B1 | 10/2003 | Arguie et al. | |
| 6,772,207 B1 | 8/2004 | Dorn et al. | |
| 6,833,850 B1 | 12/2004 | Arquie et al. | |
| 6,836,275 B1 | 12/2004 | Arquie et al. | |
| 6,880,127 B1 | 4/2005 | Arquie | |
| 6,952,208 B1 | 10/2005 | Arquie et al. | |
| 6,961,938 B1 | 11/2005 | Carwile et al. | |
| 7,197,545 B1 | 3/2007 | Davie | |
| 7,219,300 B2 | 5/2007 | Arquie et al. | |
| 7,243,299 B1 * | 7/2007 | Rubin et al. | 715/209 |
| 7,310,774 B1 | 12/2007 | Arquie et al. | |
| 7,590,648 B2 | 9/2009 | Shankar et al. | |
| 2003/0152075 A1 * | 8/2003 | Hawthorne et al. | 370/389 |
| 2004/0249790 A1 * | 12/2004 | Komamura | 707/3 |
| 2005/0149500 A1 * | 7/2005 | Marmaros et al. | 707/3 |
| 2005/0240664 A1 * | 10/2005 | Chen et al. | 709/220 |
| 2006/0026674 A1 * | 2/2006 | Ward | 726/11 |
| 2006/0036567 A1 * | 2/2006 | Tan | 707/1 |
| 2006/0101347 A1 * | 5/2006 | Runov et al. | 715/764 |
| 2006/0200455 A1 * | 9/2006 | Wilson | 707/4 |
| 2007/0214075 A1 * | 9/2007 | Ablan | 705/37 |
| 2007/0294409 A1 * | 12/2007 | Kumar | 709/226 |
| 2008/0250127 A1 * | 10/2008 | Sugisawa | 709/221 |

FOREIGN PATENT DOCUMENTS

WO   WO2007086129   *  8/2007   ............. H04L 12/56

* cited by examiner

*Primary Examiner* — Harunur Rashid

(57) ABSTRACT

A network search function is disclosed. A network administrator enters a search term. The search function determines whether any items or network devices listed in a network control user interface match the search term. The network administrator can stipulate whether the match be either an explicit match or an implicit match. All of the matches, if any, are automatically highlighted and selected. Thereby, the network administrator can perform an operation on these matches based on the search function, without having to manually locate and then manually click to select the desired items or network devices.

27 Claims, 8 Drawing Sheets

SEARCH IN NETWORK MANAGEMENT UI CONTROLS

TECHNICAL FIELD

Embodiments relate to the field of network management software. More particularly, embodiments of the present invention relate generally to performing searches in network management user interface controls.

BACKGROUND

A network provides the infrastructure that enables computers, servers, wireless devices, storage devices, peripheral devices, etc. coupled to the network to communicate and exchange data over the network.

As demand grows for networks to become faster, more reliable, and more versatile, network hardware, such as hubs, switches, routers, access servers, etc. are implemented to meet specific network demands. These hardware devices are used to facilitate the processing and transmission of data over the network. Configuring, managing, and administering large, complex networks, each with its own different, unique set of interconnected network devices, is becoming quite a difficult task.

In order to help network administrators monitor and run the network smoothly and efficiently, network management software have been developed. The network management software is typically installed and run on a server coupled to the network. Its purpose is to help network administrators control, plan, allocate, deploy, coordinate, monitor and administer the network on a day-to-day basis. Functions such as configuration management, security, fault management, performance management, and accounting are often performed by network administrators using network management software.

In the past, network management software was text based. Commands were entered by typing instructions into a command line interface. Network performance data was displayed in a rather archaic and disorganized manner on a display. It was difficult and cumbersome to interpret displayed data and enter commands based thereon, and it also required expert knowledge to operate.

In response, network management software developers have added graphical user interfaces (GUIs) to make it easier for network administrators to interface with the network management software. But even with GUIs, there exists too much relevant network data to fit onto a display. Consequently, GUIs typically implement scroll bars, whereby network administrators can scroll up and down a displayed list of items of interest. The list would typically be organized in a hierarchical tree structure.

However, scrolling up and down to find a specific item from a long list of items can be tedious. And after a network administrator locates an item, he or she must then manually select or highlight that item before operations can be performed on that item. Oftentimes, network administrators would be required to find items that fit a particular criteria or characteristic. Having to manually find each of the items is time-consuming and labor-intensive. Moreover, a network administrator may inadvertently miss an important item or click on an incorrect item. This can lead to serious security problems, cause the network to run inefficiently, or even result in network errors. Furthermore, it may be difficult or impossible to tell from the list whether an item meets or fits a particular criteria or characteristic. The network administrator may have to cross-index items in the list to a database containing known information regarding the network and user devices. Thus, hunting for, finding, and selecting items of interest in a network management GUI can be a time-consuming, frustrating, and error-prone experience for network administrators.

SUMMARY OF THE INVENTION

A network search function is disclosed. A network administrator enters a search term. The search function determines whether any items or network devices listed in a network control user interface match the search term. The network administrator can stipulate whether the search be either an explicit search or an implicit search. An explicit search determines whether the text string of the search term is exactly (or partially) the same as any of the text strings of the items or network devices that is displayable or visible to the user. An implicit search determines whether the search term matches any corresponding attribute, feature, configuration, or some other relevant network data corresponding to the items or network devices. The implicit search performs a search on attribute(s) of items that are not currently displayable or visible to the user. All matches, if any, are automatically highlighted and selected. Thereby, the network administrator can perform an operation on these matches based on the search function, without having to manually locate and then manually click to select the desired items or network devices.

BRIEF DESCRIPTION OF THE DRAWINGS

The accompanying drawings, which are incorporated in and form a part of this specification, illustrate embodiments discussed below, and, together with the detailed description, serve to explain the principles of.

DETAILED DESCRIPTION

Reference will now be made in detail to embodiments of the present claimed subject matter, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which can be included within the spirit and scope of the claimed subject matter as defined by the appended claims. Furthermore, in the following detailed description of the present claimed subject matter, numerous specific details are set forth in order to provide a thorough understanding of the present claimed subject matter. However, it will be evident to one of ordinary skill in the art that the present claimed subject matter can be practiced without these specific details. In other instances, well known methods, procedures, components, and circuits have not been described in detail as not to unnecessarily obscure aspects of the claimed subject matter.

In overview, embodiments generally relate to search capabilities that enable network administrators to search for identified items in user interface (UI) controls of a network management software application. Any matched item or items are shown highlighted so that a network administrator can perform further operations on those items, as supported by that feature or application. The network administrator can also scroll through the matched items. The search capabilities support both a text string search function as well as a more powerful regular expression based search function. For a regular expression based search, the search is performed on the textual representation as shown on the display screen. However, specific applications or features can advertise and/or provide additional search capabilities. This is especially useful during network configuration, when a network administrator's task is to perform an operation on one or more resources based on certain search criterion (e.g., device version, IP addresses, VLAN, MAC addresses, etc.).

Figure 1:
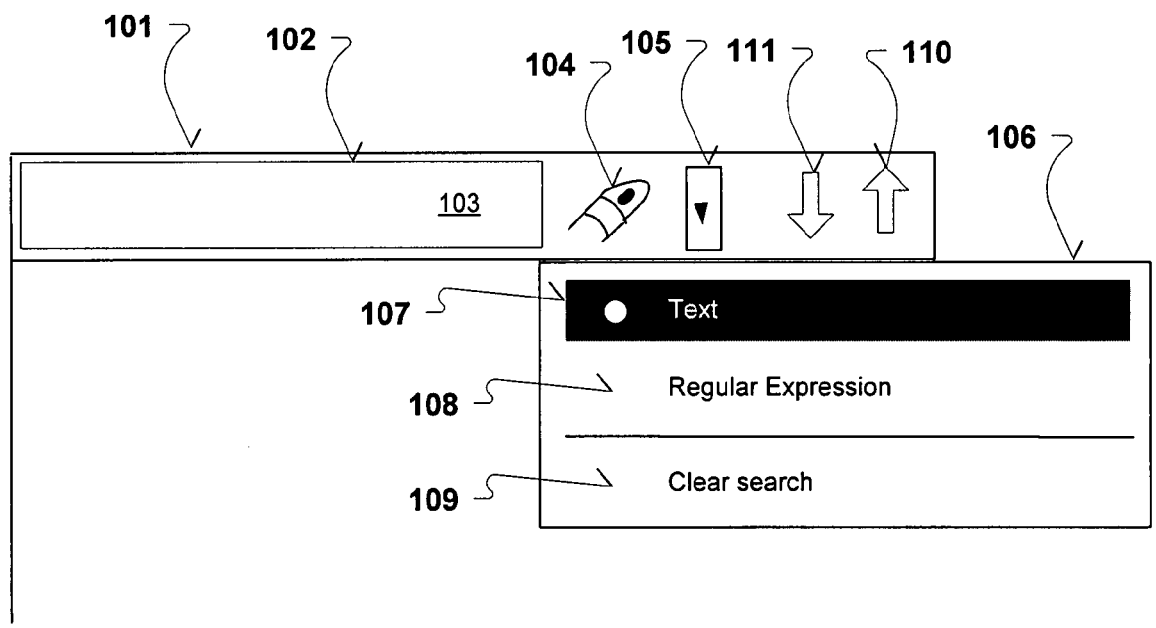
FIG. 1 shows an exemplary UI control of a network management application.

Referring now to FIG. 1, an exemplary UI control 101 of a network management application is shown. The UI control 101 is a designated area which typically contains items that are arranged in a hierarchical tree structure. These items portray a large amount of data regarding the network. The search capability enables network administrators to search in the UI control 101. In many instances, the items cannot be viewed in its entirety at the same time due to the limited physical display area of a screen or monitor. But yet, the search capability performs searches on all items in a designated UI control, even if they are not currently visible. In one embodiment, the search capability is implemented as a toolbar 102 that is attached to the top of the UI control 101. The search toolbar 102 includes a search text entry area 103. To initiate a search, the network administrator types in one or more search terms into the search text entry area 103. A searchlight icon 104 is the search button. Clicking on searchlight icon 104 initiates the search function. A search criterion selection button 105 exists to the right the search text entry area 103 and is also part of the search toolbar 102. The network administrator clicks on the search criterion selection button 105 to select "Text Search" or "Regular Expression Search" or any implicit search criterions supported by that application. The network administrator clicks on the search button 104 to run the search on the search terms entered into the search text area 103. The matched items are shown highlighted in the UI control 101.

In one embodiment, before the search is performed, a drop-down menu 106 is displayed. This drop-down menu 106 allows a network administrator to select the search criterion, such as "Text" or "Regular Expression." By selecting the "Text" field 107, the search will perform an explicit search. It will find any textual (e.g., alpha-numeric) string match between what was entered into the search text entry area 103 and the items listed in the UI control 101. All matches are highlighted. The user can run an exact match by holding down the Ctrl key on the keyboard and clicking on the searchlight icon 104. By highlighting the matches, the network administrator can easily scroll up and down a list in the UI control 101 to get a general idea of all the matches. Two arrow buttons (up arrow button 110 and down arrow button 111) enable the network administrator to scroll up and down. Furthermore, the number of matches can be displayed. In addition, by highlighting the matches, the items have already, by default, been selected. An operation or command can now be initiated on the highlighted items. This saves the network administrator from having to perform a separate action to select the matches. The operation or command selected by the network administrator can be applied automatically across all highlighted items. If the network administrator wishes to deselect one of the highlighted items, he or she can shift-click on the item that he or she wants to deselect from being highlighted. Thereby, the "Text" search saves time, eliminates errors, and gives network administrators a useful tool by which to efficiently find items and also to issue commands for controlling, monitoring, and otherwise configuring the network. It should be noted that the search functionality is not limited to network and/or device related information. The search functionality can be applied to any generic search is capable of searching any text data that is supported by the UI controls. After the search is completed, the network administrator can select the "Clear Search" field 109 to clear the search results. A new search can then be conducted.

If the network administrator selects the "Regular Expression" field 108, the search will perform an explicit search. An explicit search finds items listed in the UI control 101 that have the characteristic, attribute, or parameter entered into the search text entry area 103 within the scope of the search criterion as shown in 401. For implicit searches, the search is conducted on attributes that are not visible on the screen. These attributes correspond to the items that are displayed in a list in the UI control 101. Based on the results of the implicit search, there could be one or more items that have a matching attribute. In other words, an implicit search performs a search on attributes that are currently undisplayed or otherwise not visible to the user. The implicit search is typically performed on a database storing information regarding the network devices. For example, an implicit search can be conducted to search for network devices running a specific build. Another example of an implicit search may be to search for network devices that are running a specific image. Yet another implicit search entails searching for those devices coupled to the network that have a specific IP address. One useful implicit search relates to searching for devices that have a specific MAC address. Another useful implicit search is to search for devices that has a particular VLAN. Network administrators can also perform implicit searches for edge devices or for devices in a specified subnet. There are numerous ways by which network administrators can perform and use implicit searches.

For implicit searches, the search engine consults one or more network databases that contain relevant network information. The network information can be obtained as part of a network discovery process conducted by the network management software. When a new network device is provisioned into the network or when there are software or hardware upgrades, the changes are updated into the network database. In addition, the network management software can periodically poll the various network devices to determine their current status and other important information. There are many different, known ways to enter network related data into the database. Consequently, items will have corresponding information contained in the network databases which may be of interest to network administrators. By selecting "Regular Expression" search, the network administrator can find those items that have a characteristic, attribute, or parameter that matches one or more of the items in the UI control 101. Once the matches are found, the matching items are highlighted. By highlighting the matches of a "Regular Expression" search, the network administrator can scroll up and down a list, via buttons 106 and 107, in the UI control 101 to browse the items that match the search entry. Furthermore, the number of matches can be displayed.

In addition, by highlighting the matches, the items are automatically selected and are ready to accept one or more operations or commands to be performed on them by the network administrator. Consequently, a single operation or command, selected by the network administrator, can be applied automatically across all of the highlighted, matching items. If the network administrator wishes to deselect one or more of the highlighted items, he or she can shift-click on the item(s) that he or she wants to deselect from being a match. Thereby, the "Regular Expression" search saves time, eliminates errors, and gives network administrators a useful tool by which to efficiently issue commands to control, monitor, and otherwise configure the network. Furthermore, the "Regular Expression" search is a more powerful search tool because it enables the network administrator to search for items that have characteristics, attributes, or parameters that are complex to express like search only if the search items begin with the specified search term or ends with a search term, or combine more than one search term. However, a "Regular Expression" search automatically finds all items that match the entered characteristic, attribute, or parameter, without requiring the network administrator to explicitly determine the requisite information. Furthermore, the "Regular Expression" search operates off the most recent and up-to-date network information. Likewise, selecting the "Clear Search" field will cause the results of a "Regular Expression" search to be cleared. The Clear Search operation will clear the state from any previous searches—implicit or explicit.

Figure 2:
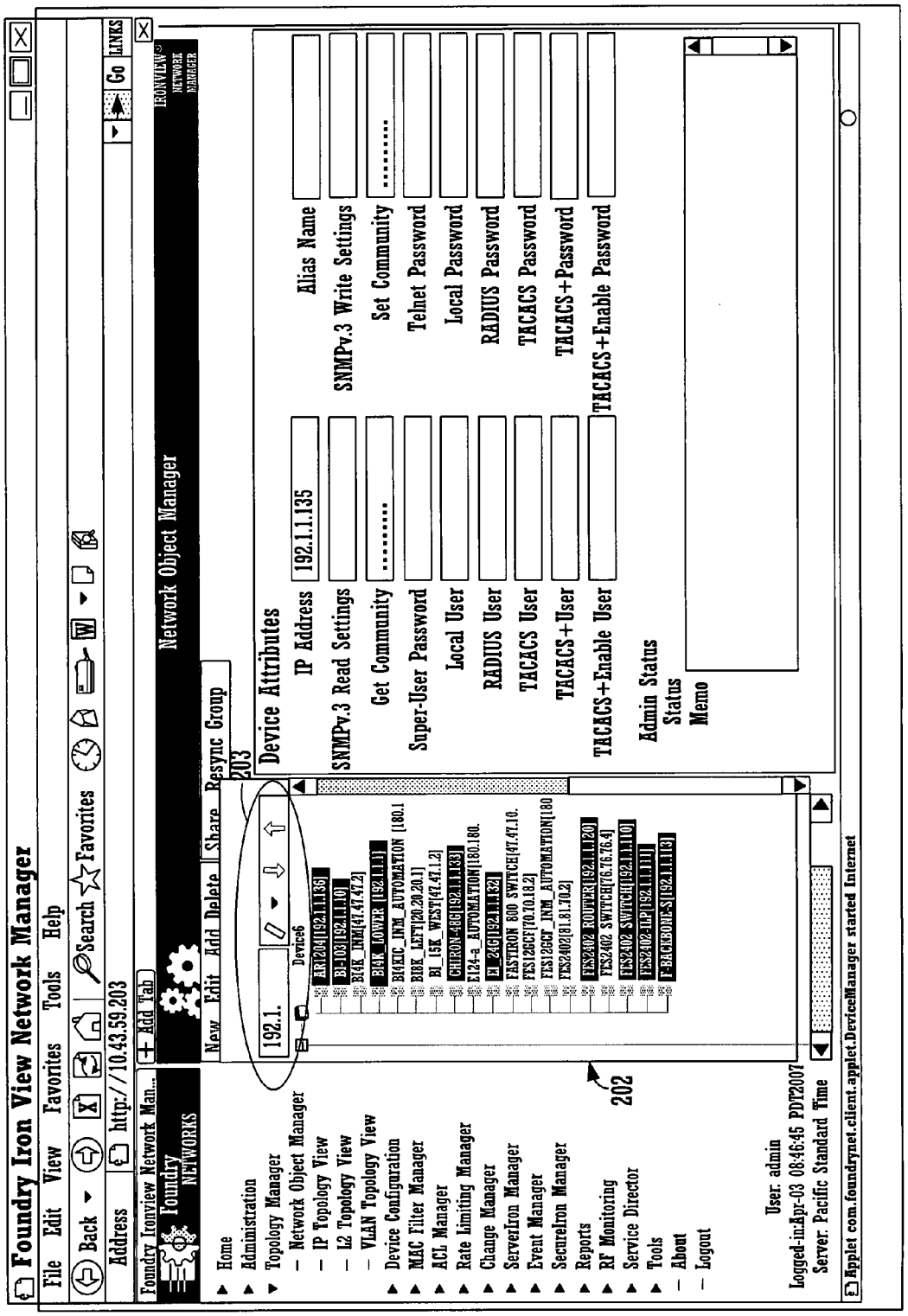
FIG. 2 shows a browser with a UI Control having a search toolbar for performing an explicit network search.

FIG. 2 shows a browser 201 with a UI Control 202 having a search toolbar 203. The network management software runs on a server coupled to the network. It displays network information and accepts commands through the network management browser 201. In this figure, an example of an explicit "Text" search is being conducted. The network administrator desires to find all devices with an IP address of "192.1." This is accomplished by typing "192.1" into the search text entry area of the search toolbar 203. After typing "Enter," the search automatically highlights all the devices beginning with the IP address of "192.1." It should be noted that the search function can search for partial matches as well as exact matches. If one wants to restrict to exact match, hold down the Ctrl Key on the keyboard and click on the search icon 104. The network administrator can now perform operations on all of the selected devices. For example, the network administrator can change the password for these devices or update software associated with these devices, etc. Furthermore, the network administrator can create and assign these highlighted devices to a specific group. In this manner, for future operations, the network administrator can readily select the group to select all of these devices rather than having to perform another search or to manually select the devices. This grouping function is a way by which network administrators can create handy, efficient, and adaptable shortcuts. It eliminates redundancy in the network administrators' workloads.

Figure 3:
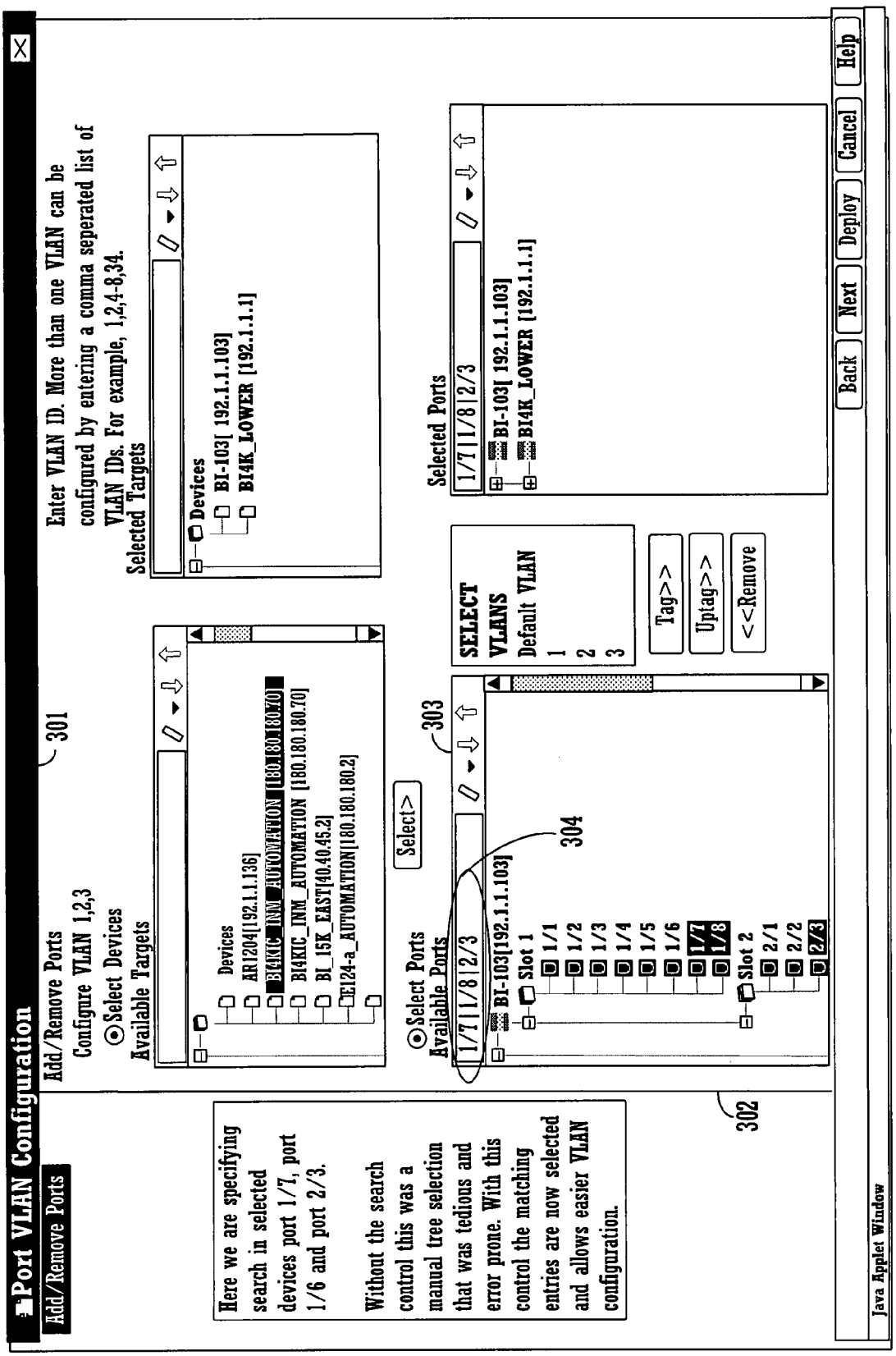
FIG. 3 shows a search toolbar for performing an explicit network search.

FIG. 3 shows a browser 301 with a UI Control 302 having a search toolbar 303. In this figure, an example of a "Regular Expression" explicit search is being performed. In this example, the network administrator's task is to configure VLANs on multiple devices. The network administrator can accomplish this task by specifying ports using a "Regular Expression" search. The Regular Expression search is an explicit search because it is searching from what is displayable or visible from the screen. For example, the network administrator can specify searching in selected devices port 1/7, port 1/8, and port 2/3 (as shown in 304). It can be seen that the appropriate ports are automatically selected. Note that the second device is not entirely visible on the screen, but it has its appropriate ports selected. The selected ports are now selected and available for VLAN configuration by the network administrator.

Figure 4:
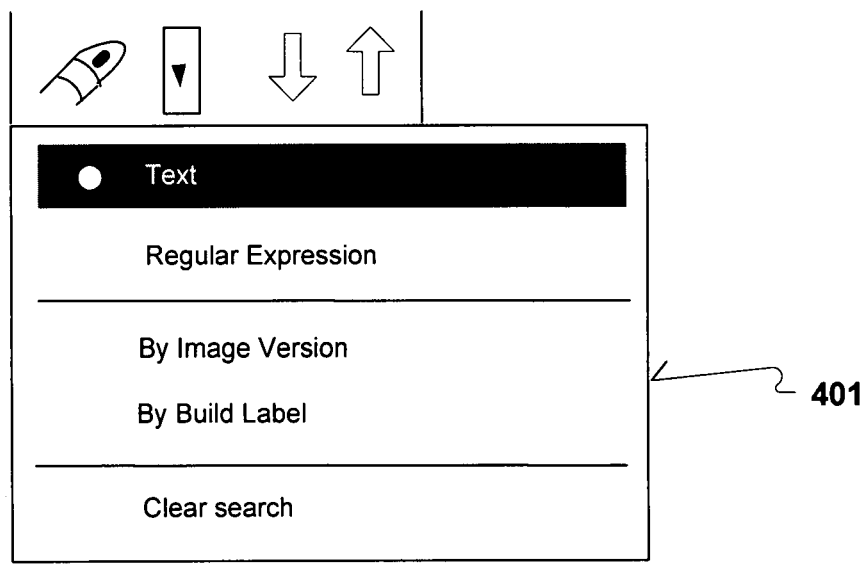
FIG. 4 shows an application with a drop-down menu that provides implicit search capabilities suggested by a network application.

In one embodiment, an application upon which the search is performed, can automatically advertise or otherwise notify the network administrator of specific search capabilities related to that application. This type of search is referred to as an implicit search. FIG. 4 shows an application with a drop-down menu that provides additional search capabilities. In this example, drop-down menu 401 displays two fields, "By Image Version" and "By Build Label." The network administrator can point a mouse and click on either of these two fields to execute a search by either image version or build label on the designated devices. In another example, a security manager application can notify the network administrator of the ability to search for edge devices via the drop-down menu. The network administrator can search and identify edge devices, which can then have access control performed specifically on the edge devices. In another example, a VLAN Configuration application can offer a "Group" capability, whereby devices belonging to a particular VLAN can be searched and then grouped together for future reference. This resolves scalability issues by enabling quick and easy search and selection of VLANs for configuration purposes. Other applications can display their specific, related search capabilities. Furthermore, this search capability is customizable.

Figure 5:
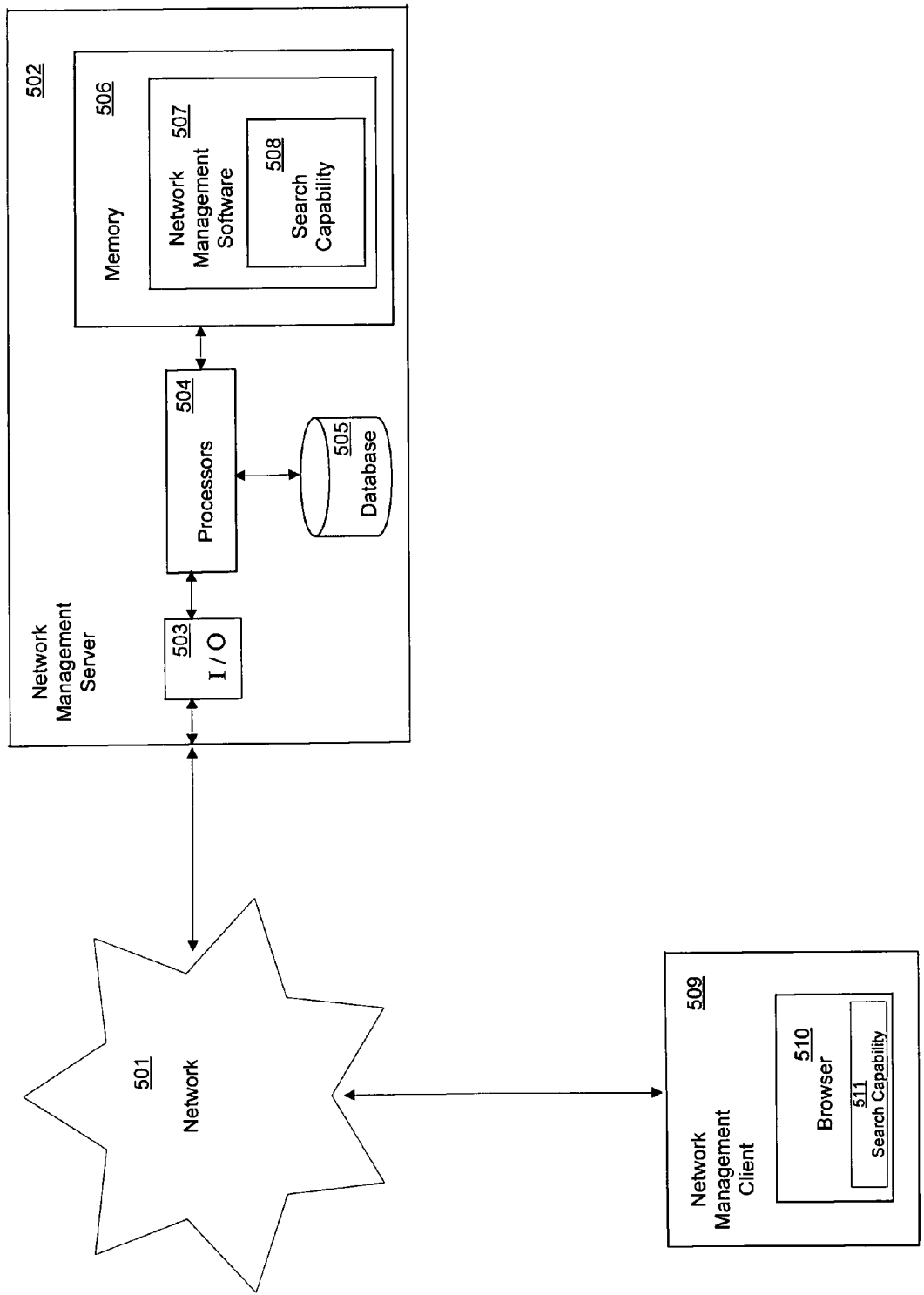
FIG. 5 shows a system for implementing an embodiment of the present disclosure for a network search capability.

FIG. 5 shows a system for implementing an embodiment of the present disclosure. A network management server 502 is coupled to a network 501. Network 501 has a multitude of user devices (e.g., personal computers, wireless devices, etc.), servers, and peripheral devices (e.g., printers, storage devices, scanners, terminals, etc.) coupled together via network devices (e.g., hubs, switches, routers, etc.). The network management server 502 monitors and controls the operations of network 501. Network management server is comprised of an input/output (I/O) interface 503 for communicating with network 501, one or more processors 504, a database 505, and memory 506. The processors 504 are used to perform regular network server functions. Network data is retained in database 505. Database 505 can be either part of or external to the network management server 502.

In one embodiment, the network management software 507 also includes a search capability software 508. This search capability software 508 performs a search of the network database to find matches to explicit and implicit searches entered by the network administrator. The selected matches can now have operations performed on them by the network management software 507. In addition, search capability software 508 can have specific, identified search capabilities associated with particular network applications. These search capabilities are displayed to the network administrator when the corresponding applications are invoked. In one embodiment, the network data generated by network management server 502 is transmitted over network 501 to network management client 509. Alternatively, the network management client can also run on the same machine as the server. The network data is displayed (textually and graphically) via a browser 510. The network administrator monitors the network 501 via browser 510 and also issues commands via browser 510, which is then sent to network management server 502 for execution. In one embodiment, browser 510 includes a search capability 511 which enables the network administrator to initiate searches related to the network. These searches can be applied to various network applications and identified set of network devices. The searches can be explicit or implicit to network UI controls (e.g., a list of items upon which commands can be executed). The items can be device names, addresses, VLAN designations, ports, device types or classifications, etc. In one embodiment, the search is run on the client side (e.g., 509) on the database 505. The search results can be highlighted or selected in the client application.

Figure 6:
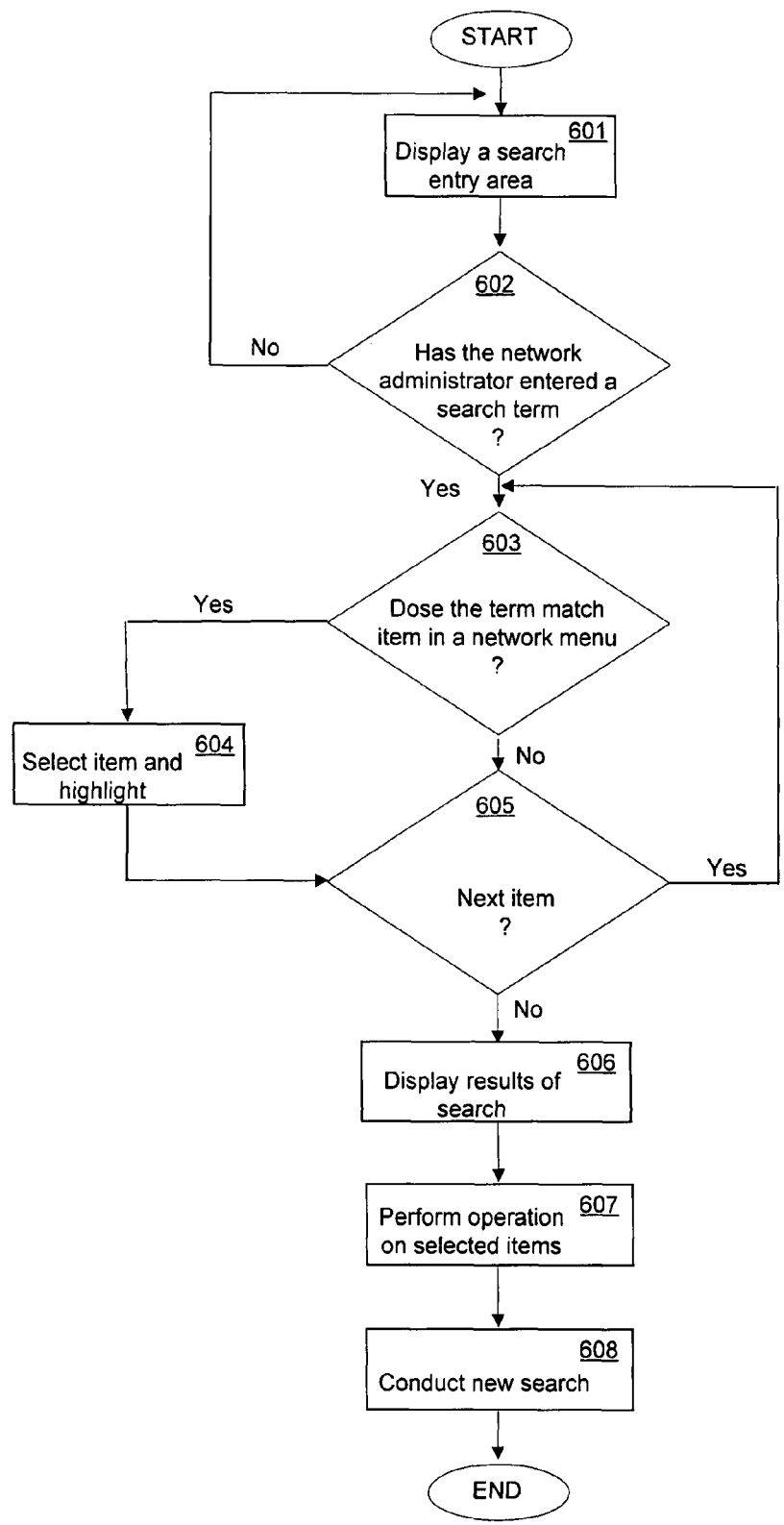
FIG. 6 is a flowchart describing an explicit search process according to one embodiment of the disclosure.

FIG. 6 is a flowchart describing an explicit search process according to one embodiment of the disclosure. Initially, in step 601, a search entry area is displayed to the network administrator. The network administrator can enter a search term in the form of a text string (e.g., characters, numbers, symbols, punctuation, etc.). Step 602 determines whether the network administrator has initiated a search. For simple or uncomplicated searches, the network administrator can manually search a UI control or other menu and manually select items and bypass the search function. Once a search term has been entered and a search initiated, a determination is made as to whether the term matches an item in a network menu, step 603. The match can be either an exact match or can be a partial match. The type of match can be specified by the network administrator. If the item's text string matches the text string entry of the search term, it is selected and highlighted for display, step 604. Otherwise, the process proceeds to the next item in the network menu, step 605. Steps 603-605 are performed until all items in the network menu have been searched for possible matches. Thereupon, step 606 displays the results of the search. The list of items in the network menu are displayed with matching items selected and highlighted. In step 607, the network administrator can optionally perform one or more operations on the selected items. A new search can be conducted with a new search term in step 608, which begins the process over at step 601.

Figure 7:
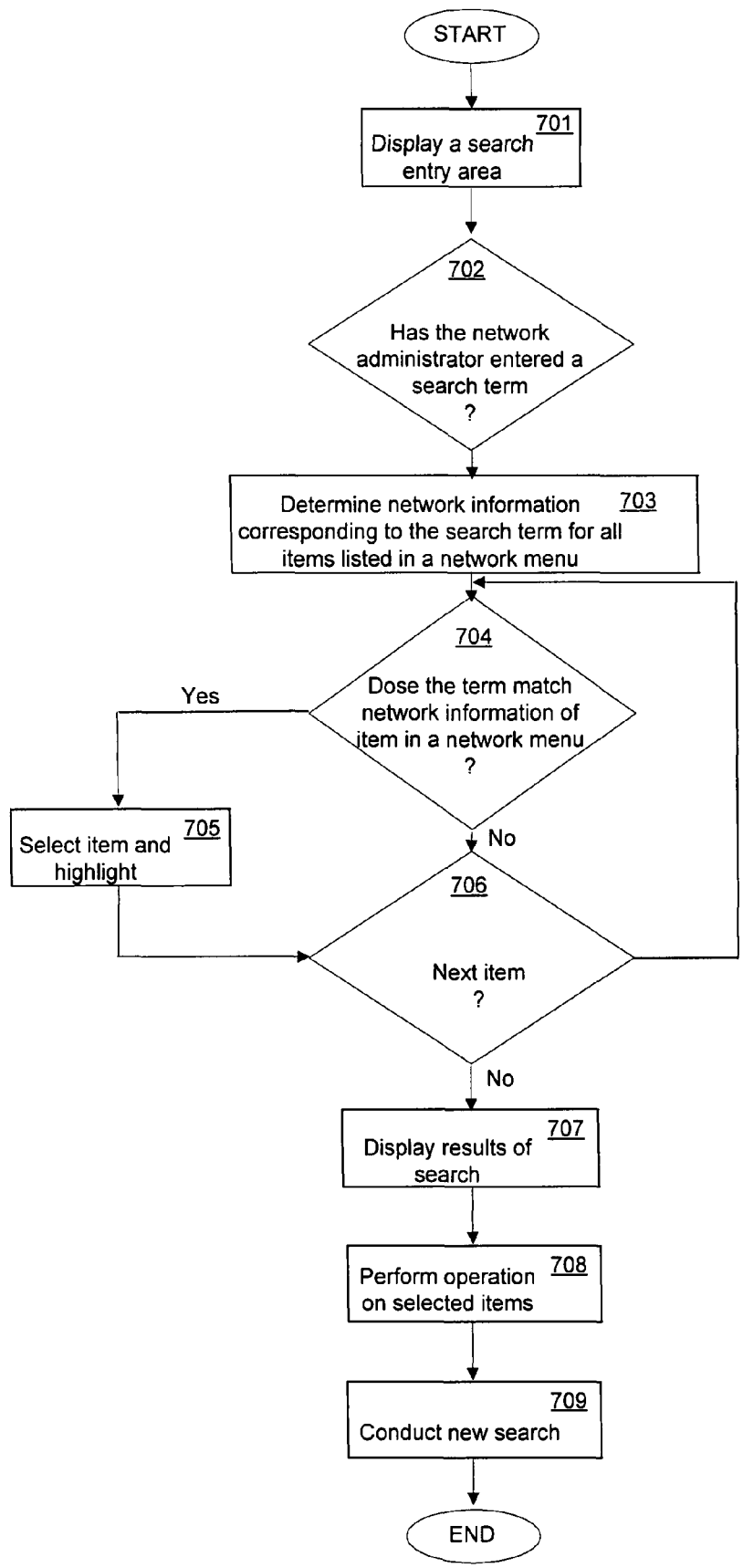
FIG. 7 is a flowchart describing an implicit search process according to one embodiment of the disclosure.

FIG. 7 is a flowchart describing an implicit search process according to one embodiment of the disclosure. Initially, in step 701, a search entry area is displayed to the network administrator. The network administrator can enter a search term in the form of a text string (e.g., characters, numbers, symbols, punctuation, etc.). Step 702 determines whether the network administrator has initiated a search. For simple or uncomplicated searches, the network administrator can manually search a UI control or other menu and manually select items and bypass the search function. For an implicit search, network information corresponding to network devices are stored in a database. The network information can be an attribute, characteristic, configuration, identification, etc. of a network device or item. This network information can be periodically updated either automatically by the network management software or by the network administrator. A discovery process can be initiated to determine the network information. Furthermore, the network management software can poll all network devices upon which the search has been initiated to determine the relevant network information. In any case, network information is determined through various mechanisms corresponding to the search term for all items listed in a network menu, step 703.

In step 704, the process determines whether network information matches the search term for an item listed in the network menu. The match can be an exact or partial text string match. Alternatively, the match can be based on heuristics, algorithmically, or interpreted. The search term need not, and probably will not, match the text display representing the item in the network menu. If the network information corresponding to the item matches the search term, the item is selected and highlighted for display, step 705. Otherwise, the process proceeds to the next item in the network menu, step 706. Steps 704-706 are performed until all items in the network menu have been searched for possible matches. Thereupon, step 707 displays the results of the search. The list of items in the network menu are displayed with those items having characteristics, attributes, configurations, etc. which match the search term are selected and highlighted. In step 708, the network administrator can optionally perform one or more operations on the selected items. A new search can be conducted with a new search term in step 709, which begins the process over at step 701. In some cases, searching the entire UI control may not be efficient as the item(s) of interest may be scoped within just one or more nodes. The user can select the node(s) that may have the item(s) that the user is interested in and then run the search. Thereupon, the search will be restricted within the item(s) under selected node(s) only.

Figure 8:
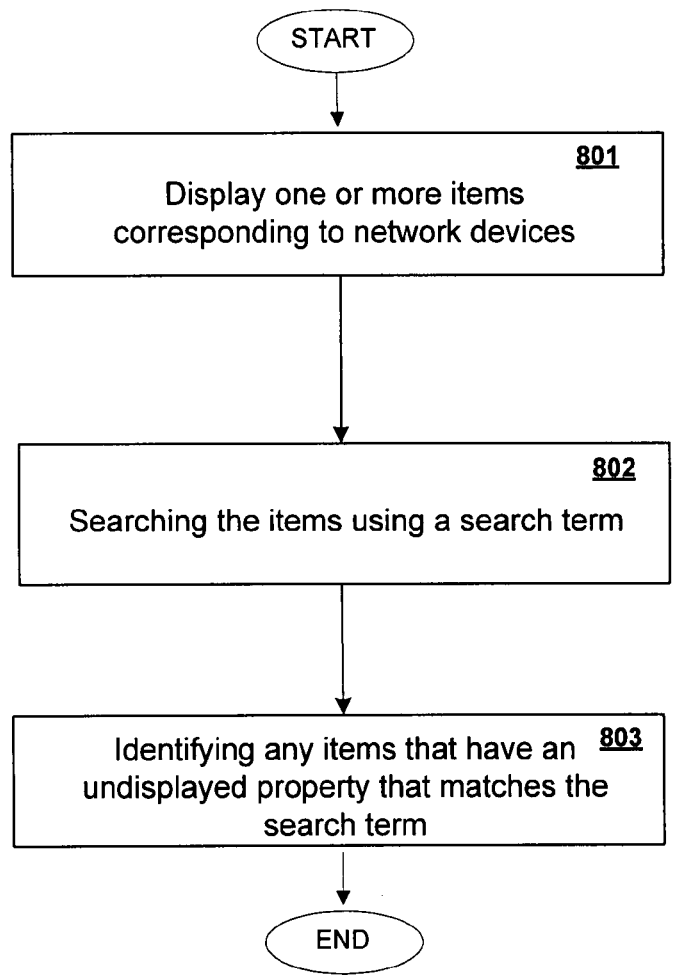
FIG. 8 shows a flowchart of the process for conducting an implicit search according to one embodiment.

FIG. 8 shows a flowchart of the process for conducting an implicit search according to one embodiment. In step 801, one or more items corresponding to one or more network devices are displayed. For example, the item(s) could be displayed in a network management user interface. It could also be displayed in a browser. A search term is entered in step 802. A search is run on the item(s) based on the search term. All items, if any, are identified that have a property that matches the search term in step 803. In one embodiment, the property being searched for is one of many different properties stored in a database pertaining to items corresponding to network devices. The property that is being searched is not displayed. Although the property could potentially be called up for display, it is not displayed before initiating the search. Consequently, one of the benefits of the implicit search functionality is that a network administrator can search for properties that are typically hidden from view. Some examples where it is useful to run implicit searches include, but are not limited to, searching for network devices running a specific build or image as well as searching for network devices with a specific IP address, MAC address, VLAN, or subnet.

In conclusion, a search function in network UI controls is disclosed. In the foregoing specification, embodiments of the claimed subject matter have been described with reference to numerous specific details that can vary from implementation to implementation. Thus, the sole and exclusive indicator of what is, and is intended by the applicants to be the claimed subject matter is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of managing network devices coupled to a network comprising:
   displaying items corresponding to the network devices;
   accepting a search term;
   searching the items to find matches between the search term and the items;
   visually indicating items that match the search term;
   automatically selecting the items that match the search term, wherein a network operation that modifies a setting of the items that match the search term is performed without having to re-select the items, wherein the network operation comprises at least one of controlling, monitoring, and configuring the items;
   comparing the search term to network information corresponding to the items to find potential matches;
   displaying at least one search criterion, wherein the search criterion is based on a selected network application; and grouping selected items that match the search term into a group and assigning an identifier for the group, wherein selecting the identifier causes all of the items belonging to the group to be selected.

2. The method of claim 1 further comprising:
comparing a text string of the search term to text strings of the items to find potential matches.

3. The method of claim 1 further comprising:
displaying the items corresponding to the network devices in a network control.

4. The method of claim 1, wherein the search term corresponds to an image version.

5. The method of claim 1, wherein the search term corresponds to an IP address.

6. The method of claim 1, wherein the search term corresponds to a VLAN.

7. The method of claim 1, wherein the search term corresponds to a subnet.

8. The method of claim 1, wherein the search term corresponds to a build label.

9. The method of claim 1 further comprising:
displaying a search tool bar as part of a user interface for controlling network devices, wherein the search tool bar accepts the search term.

10. The method of claim 9 further comprising:
displaying buttons in the search tool bar for scrolling through a list of the items arranged in a tree configuration.

11. The method of claim 9 further comprising:
displaying a search button in the search tool bar, wherein clicking on the search button initiates a search function.

12. The method of claim 9 further comprising:
displaying a button, wherein when selected, displays a menu of a plurality of search criterion selectable by a user.

13. The method of claim 12, wherein one of the search criterions comprises text.

14. The method of claim 12, wherein one of the search criterions comprises regular expression.

15. An apparatus for managing a network comprising:
an interface coupled to the network that transmits commands to control operations of network devices coupled to the network and also receives network status information from the network devices;
a memory coupled to the interface, wherein the memory stores network management software including a search function;
a processor coupled to the interface that runs the network management software and searches for network items that match a user entered search term, any matching items are automatically displayed and selected by the network management software, selected items that match the search term are grouped into a group and assigned an identifier for the group, wherein selecting the identifier causes all of the items belonging to the group to be selected, wherein an operation specified by a user is performed that changes a setting on all items that are selected without having to re-select the items and the operation comprises at least one of controlling, monitoring, and configuring the selected items; and
a display coupled to the processor that displays the items corresponding to the network devices in a network control, wherein the display further displays a search tool bar as part of a user interface for controlling the network devices and the processor compares the search term to network information corresponding to the items to find potential matches.

16. The apparatus of claim 15, wherein the processor compares a text string of the search term to text strings of the items to find potential matches.

17. The apparatus of claim 15, wherein the network management software includes search criterion which are based on particular network applications.

18. The apparatus of claim 15, wherein the network management software includes a grouping function that associates all matching items into a single, selectable identifier.

19. The apparatus of claim 15, wherein the search term corresponds to an image version.

20. The apparatus of claim 15, wherein the search term corresponds to an IP address.

21. The apparatus of claim 15, wherein the search term corresponds to a VLAN.

22. The apparatus of claim 15, wherein the search term corresponds to a subnet.

23. The apparatus of claim 15, wherein the search term corresponds to a build label.

24. In a computer system for displaying a network management graphical user interface, a method of providing a network search function, comprising:
displaying a network control having a list of network devices;
receiving a search term entered by a network administrator;
determining which, if any, of the network devices correspond to the search term;
generating a visual indication for and selecting the network devices that have been determined to correspond to the search term, wherein a network operation is simultaneously performed to modify a setting on the network devices that have been determined to correspond to the search term without having to manually re-select the items, wherein the network operation comprises at least one of controlling, monitoring, and configuring the selected network devices;
displaying a menu of search options corresponding to a specified network application from which the network administrator can select to have searched; and
grouping all network devices that has been determined to correspond to the search term in to a group, wherein selecting the group automatically selects all of the network devices in the group.

25. The method of claim 24, wherein the search function comprises an explicit search.

26. The method of claim 24, wherein the search function comprises an implicit search.

27. A method of managing network devices coupled to a network comprising:
displaying items corresponding to the network devices, the network devices including at least one undisplayed property;
searching the items using a search term;
identifying by said searching respective ones of the items that have a said undisplayed property that matches the search term;
automatically selecting the items that have said undisplayed property, wherein a single network operation is performed to modify a setting on all of the selected items at the same time, wherein the network operation comprises at least one of controlling, monitoring, and configuring the selected items;
displaying a search tool bar as part of a user interface for controlling network devices, wherein the search tool bar accepts the search term;
displaying at least one search criterion, wherein the search criterion is generated by a network application; and grouping selected items that match the search term into a group and assigning an identifier for the group, wherein selecting the identifier causes all of the items belonging to the group to be selected.

* * * * *